US009136048B2

(12) United States Patent
Takahashi et al.

(10) Patent No.: US 9,136,048 B2
(45) Date of Patent: Sep. 15, 2015

(54) WIRE HARNESS PROTECTOR

(75) Inventors: Yuten Takahashi, Yokkaichi (JP); Taiki Sudo, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 198 days.

(21) Appl. No.: 13/812,330

(22) PCT Filed: Apr. 6, 2011

(86) PCT No.: PCT/JP2011/058719
§ 371 (c)(1),
(2), (4) Date: Jan. 25, 2013

(87) PCT Pub. No.: WO2012/026155
PCT Pub. Date: Mar. 1, 2012

(65) Prior Publication Data
US 2013/0118778 A1 May 16, 2013

(30) Foreign Application Priority Data

Aug. 25, 2010 (JP) ................................. 2010-188317
Feb. 17, 2011 (JP) ................................. 2011-032436

(51) Int. Cl.
*H02G 3/04* (2006.01)
*H02G 3/06* (2006.01)
(Continued)

(52) U.S. Cl.
CPC ............ *H01B 17/02* (2013.01); *B60R 16/0215* (2013.01)

(58) Field of Classification Search
CPC ... H01B 13/0013; H02G 3/04; H02G 3/0418; H02G 3/045; H02G 3/0456; H02G 3/0481; H02G 3/0487; H02G 3/06; H02G 3/0616; H02G 3/0633; H02G 3/0658; H02G 3/0691; F16L 9/17; H02B 1/202; B60R 16/0207; B60R 16/0215
USPC ......... 174/21 R, 68.2, 68.3, 71 R, 72 C, 73.1, 174/15 R, 84 R, 92, 135, 154, 75 R; 138/161, 138/162, 163, 166
See application file for complete search history.

(56) References Cited

U.S. PATENT DOCUMENTS 3,347,276 A * 10/1967 Dunn ............................ 138/166
4,647,713 A * 3/1987 de Nijs et al. ............... 174/21 R
(Continued)

FOREIGN PATENT DOCUMENTS

JP 1-39047 11/1989
JP 5-38725 5/1993
(Continued)

OTHER PUBLICATIONS

English Machine Translation of Sumitomo (JP6-66233) Oct. 17, 2014.*
(Continued)

*Primary Examiner* — Chau N Nguyen
*Assistant Examiner* — Roshn Varghese
(74) *Attorney, Agent, or Firm* — Greenblum & Bernstein P.L.C.

(57) ABSTRACT

A protector includes a trunk wire insertion portion and a branch wire insertion portion that projects from a peripheral edge of a branch wire outlet provided to one or two side walls in a center length direction of the trunk wire insertion portion. Cuts are provided from upper end side to the two side walls of the peripheral edge of the branch wire outlet of the branch wire insertion portion. Engagement tabs project from the upper end of one side wall of the opposing two side walls of the trunk wire insertion portion, and engagement holes are provided to the other side wall of the opposing two side walls so as to engage with the engagement tabs. After a trunk wire and a branch wire are inserted, the engagement tabs are inserted to and engaged with the engagement holes to close the upper end of the two side walls.

6 Claims, 9 Drawing Sheets

(51) Int. Cl.
*H01R 4/00* (2006.01)
*H02G 15/08* (2006.01)
*H01B 7/00* (2006.01)
*H01B 17/00* (2006.01)
*F16L 9/00* (2006.01)
*H01B 17/02* (2006.01)
*B60R 16/02* (2006.01)

(56) References Cited

U.S. PATENT DOCUMENTS

| | | | | |
|---|---|---|---|---|
| 5,161,580 | A * | 11/1992 | Klug | 174/68.3 |
| 5,318,076 | A * | 6/1994 | Klein | 138/147 |
| 5,338,014 | A | 8/1994 | Kitamura | |
| 5,352,855 | A * | 10/1994 | Potter | 174/135 |
| 5,353,201 | A * | 10/1994 | Maeda | 174/362 |
| 5,589,667 | A * | 12/1996 | Tsukazaki et al. | 174/135 |
| 5,626,316 | A * | 5/1997 | Smigel et al. | 248/68.1 |
| 7,220,923 | B1 * | 5/2007 | Sheehan et al. | 174/668 |
| 7,628,178 | B2 * | 12/2009 | Ackermann et al. | 138/110 |
| 7,690,628 | B2 * | 4/2010 | Hewitt et al. | 256/54 |
| 2002/0088095 | A1 * | 7/2002 | Hahn | 24/115 A |
| 2005/0022344 | A1 * | 2/2005 | Igarashi | 24/16 PB |
| 2006/0219423 | A1 * | 10/2006 | Suzuki et al. | 174/72 A |

FOREIGN PATENT DOCUMENTS

| | | |
|---|---|---|
| JP | H6-66233 | 9/1994 |
| JP | 7-322441 | 12/1995 |
| JP | 2000-350329 | 12/2000 |
| JP | 2002-176716 | 6/2002 |
| JP | 3346341 B2 | 11/2002 |
| JP | 3752148 B2 | 3/2006 |

OTHER PUBLICATIONS

Definition "plastic" from www.dictionary.com Oct. 14, 2014.*
Definition "resin" from www.dictionary.com Oct. 14, 2014.*
International Search Report dated Jun. 28, 2011.

* cited by examiner

WIRE HARNESS PROTECTOR

TECHNICAL FIELD

The present invention relates to a wire harness protector. More specifically, the present invention relates to a protector that is made of a molded resin and covers a wire harness to protect a wire harness routed in an automobile and to regulate a routing path. Especially, the present invention closes an opening of a branching portion of a protector to provide protection.

BACKGROUND ART

A wire harness protector of this type is closed by capping a lid after a wire harness is inserted into a protector main body having a trench shape. Furthermore, in Japanese Utility Model Laid-Open Publication No. H6-66233, after a wire harness W/H is inserted into a protector main body 100, a tape 101 is wound around an outer peripheral surface of the protector main body 100 so that the wire harness W/H is retained without coming off from an upper opening 100a of the protector main body 100, as shown in FIGS. 14(A) and (B). In doing so, two side walls of the protector main body 100 are cut to include thin walls 100b and 100c having flexibility. The tape 101 is wound around the thin walls 100b and 100c so that the thin walls 100b and 100c are closely attached to the upper surface of the wire harness W/H, thereby the wire harness is retained firmly.

Figure 14:
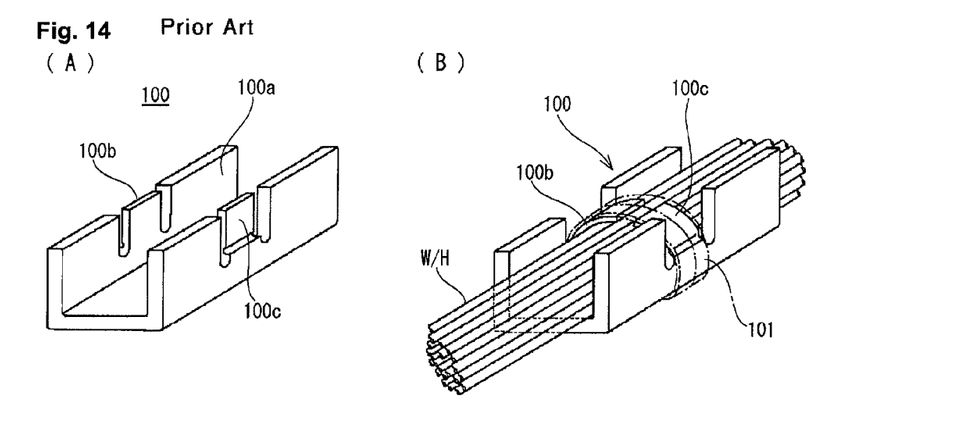

The wire harness W/H is linearly inserted through the protector shown in FIG. 14, whereas a wire harness is branched into a branch wire W/H-B from a trunk wire W/H-A as shown in FIGS. 15(A) and (B). In this case, a main body 121 of a protector 120 is formed into a T-shape and is integrally formed into a shape in which a branch wire insertion portion 121b is branched off from a trunk wire insertion portion 121a. In addition, a lid 122 to cover the main body 121 is integrally provided with a thin-wall hinge 123 therebetween such that the lid 122 and the main body 121 are substantially symmetrical.

Figure 15:
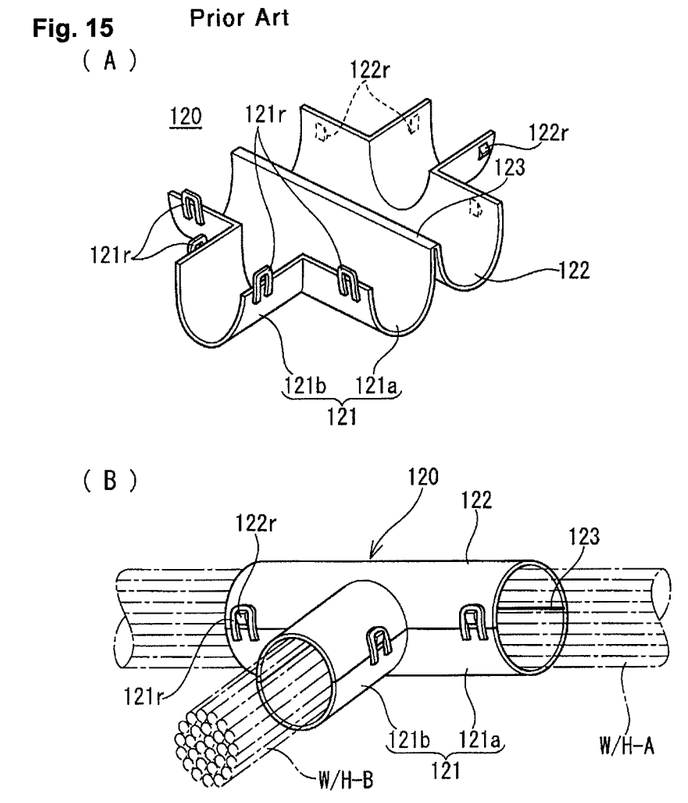

In the protector 120 shown in FIG. 15, after a wire harness is inserted into the main body 121, the lid 122 is rotated to close an upper opening of the main body 121, and locking tabs 122r in the lid 122 are engaged with locking frames 121r in the main body 121 for lock connection.

CITATION LIST

Patent Literature

Patent Literature 1: Japanese Utility Model Laid-Open Publication No. H6-66233

SUMMARY OF INVENTION

Technical Problem

When a wire harness needs to be branched at a position at which the wire harness is inserted into a protector, a protector having a shape shown in FIG. 15 is required. As described above, however, integral formation of the main body 121 and the lid 122 with the thin-wall hinge 123 therebetween results in increased costs due to high costs for making a mold.

Figure 16:
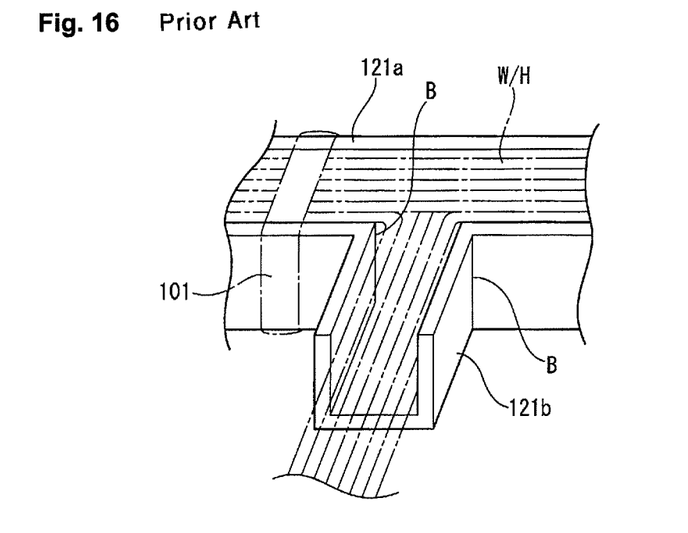
FIG. 16 A diagram illustrating a problem of a conventional art.

On the other hand, in a case where tape-winding is performed instead of providing a lid, as shown in FIG. 14, costs can be reduced compared to the case of providing a lid. In a case where a protector main body has a T-shape or a cross shape having a branching portion, however, even when an outer periphery of a linear trunk wire insertion portion 121a is wound by a tape 101, opposing two side walls in the trunk wire insertion portion 121a cannot be brought down close to each other because a peripheral wall of the trunk wire insertion potion 121a is continuous to a branch wire insertion portion 121b at a branching position B, as shown in FIG. 16. Thus, protection for a wire harness W/H inserted through the protector is poorer, and the wire harness is likely to be unstable in an interior of the protector.

The present invention has been devised in view of the circumstances above. The present invention intends, in a protector having a branching portion, to enable an upper opening of a protector main body to be easily closed without any lid, and thus to reduce costs of the protector.

Solution to Problem

In order to resolve the above situation, the present invention provides a wire harness protector made of a resin, in which a wire harness insertion portion is surrounded by a bottom wall and two side walls and is provided with openings at both ends in a length direction and at an upper end. The wire harness protector includes a trunk wire insertion portion and a branch wire insertion portion as the wire harness insertion portion, the trunk wire insertion portion passing in a length direction, the branch wire insertion portion projecting from a peripheral edge of a branch wire outlet, which is provided to at least one side wall at a central position in the length direction of the trunk wire insertion portion, the branch wire insertion portion being provided with cuts from upper end side to the two side walls of the peripheral edge of the branch wire outlet. At least the trunk wire insertion portion has engagement tabs and engagement holes, the engagement tabs projecting from the upper end of one side wall of the mutually opposing two side walls, the engagement holes being provided to opposite positions in the other side wall so as to engage with the engagement tabs, the engagement tabs and the engagement holes each being provided to have spaces in-between in the length direction. After a trunk wire and a branch wire are inserted into the trunk wire insertion portion and the branch wire insertion portion, respectively, the engagement tabs are inserted to and engaged with the engagement holes to close the upper ends of the two side walls.

As described above, even when the protector has the branch wire insertion portion branching off from the trunk wire insertion portion, the side walls of the trunk wire insertion portion are easily separated since the cuts are provided from the side wall upper ends to the peripheral edge of the branch wire outlet, thereby allowing the upper ends of the two side walls of the trunk wire insertion portions to bend so as to come close to each other. Thus, the engagement tabs can be inserted to and engaged with the engagement holes by making the upper ends of the two side walls come closer, and thus the upper ends of the two side walls can be locked to close the upper end of the trunk wire insertion portion. Accordingly, even without a lid, the wire harness inserted through the protector can be protected, and production costs of the protector can be reduced. In addition, no tape-winding is required after the wire harness is inserted into the protector, and thus work for tape winding can be also omitted.

The side walls of the trunk wire insertion portion and the side walls of the branch wire insertion portion are continuous via a curved boundary on both left and right sides of the branch wire outlet, and the cuts are provided at the curved boundary. To increase the width of the cuts, the cuts may be provided to the side walls of the branch wire insertion portion so as to have a predetermined width from the curved boundary. Further, slit-like thin cuts are most preferably provided to the curved boundary. Length of the cuts may be from the upper ends of the side walls to around a center in a height direction of the side walls.

The trunk wire insertion portion and the branch wire insertion portion of the protector each may have a cross section in a squared U-shape, a U-shape, or a semicircle.

When the branch wire insertion portion is 50 mm or longer, the engagement tabs and the engagement holes, which are opposing to engage with each other, are preferably provided to the side walls of the branch wire insertion portion. The upper portions of the two side walls in the trunk wire insertion portion are engaged with each other to close the upper opening of the trunk wire insertion portion as described above. However, in a case where a length of the branch wire insertion portion is relatively short, the engagement tabs and the engagement holes are not required. When the length is 50 mm or more as descried above, the engagement tabs and the engagement holes for engagement are preferably provided in opposing positions on the two side walls, similar to the trunk wire insertion portion.

Ribs, which are longer than the engagement holes, are preferably provided so as to project from an internal surface of the side wall along lower edges of the engagement holes. In addition, the ribs preferably extend longer than the engagement holes. With the ribs provided, the engagement tabs on the opposite side can be smoothly inserted into and engaged with the engagement holes by being pushed in along upper surfaces of the ribs. Moreover, it is prevented from occurring that the engagement tabs are pushed in lower than the ribs, are buried into electric wires, and are thus unable to form engagement.

The ribs project from the inner surface of the side wall of the trunk wire insertion portion and/or the branch wire insertion portion. Thus, it is required that the ribs do not interfere with insertion of electric wires into interiors of these insertion portions. Accordingly, an amount of projection of each rib from the side wall inner surface is preferably 5 mm or less. Alternatively, in a case where the projection amount is 5 mm or more, the ribs preferably deflect downwardly when electric wires are pushed in from above.

Each engagement tab, which is inserted to and engaged with each engagement hole, preferably has a V-shape in which a stem continues in a bend-back state from a front end of a projecting portion projecting from the upper end of the side wall, deflects so as to decrease an angle while being inserted into the engagement hole, and returns to an original state to open up after the insertion so that the engagement tab does not come off from the engagement hole. As described above, it is preferable that strong engagement be provided so as not to be disengaged even when pressure is applied from outside in a state where the engagement tabs and the engagement holes are engaged with each other.

It is preferable that each engagement hole be an elongated hole; protection portions project from both sides of each engagement hole; and the stem be provided between the protection portions. With such a configuration, disengagement due to interference from outside to the engagement tabs is successfully prevented.

Further, an apex of one side wall having engagement tabs and an apex of the other wall having the engagement holes are preferably provided on a substantially same plane. With such a configuration, closing work can be easily performed.

In the present invention, when a wire harness is assembled on an assembly work table (i.e. a drawing board), electric wires constituting the wire harness are inserted into the protector while the protector is held by a jig erected on the assembly work table. In doing so, a trunk wire is inserted into a trunk wire insertion portion and a branch wire is inserted into a branch wire insertion portion. After the insertion of the electric wires, the engagement tabs in the protector are inserted into and engaged with the engagement holes, and thereby the wire harness is assembled so as to be covered from outside by the protector.

In order to securely position and hold a protector when the protector is held by the jig erected on the assembly work table, jig insertion holes are preferably provided to a central portion in a width direction of each of the bottom wall on both sides of the trunk wire insertion portion sandwiching the branch wire insertion portion and the bottom wall of the branch wire insertion portion in the protector, and a central shaft of each jig is preferably inserted into each of the jig insertion holes provided in at least the three positions in total. Furthermore, in a case where the trunk wire insertion portion and the branch wire insertion potion are long, the jig insertion holes may be provided to the bottom wall with spaces therebetween. As described above, however, when jigs are inserted in at least three positions corresponding to vertices of a triangle, the protector can be successfully positioned and held. Accordingly, when the central shafts of the jigs are inserted into the jig insertion holes provided to the bottom walls of the protector and thereby the protector is supported, the protector is successfully prevented from rotating and shifting in a trunk wire direction. Thus, rotation and shifting of the protector that may occur when the protector is supported by a U-shaped jig only can be prevented. Therefore, the electric wires inserted through the protector can be prevented from being loose.

Each jig, the central shaft of which is inserted into the jig insertion hole in the bottom wall of the protector, is a jig in which only the central shaft protrudes from the center of the holder whose diameter is larger than that of the jig insertion hole. The central shaft of the jig may be descended or may be bent and laid when not in need. When the protector is large in size, the above-described jig may be used in combination with the U-shaped jig that fits from outside and holds the protector. Furthermore, a jig may have a central shaft projecting from a center of a bottom of a U-shaped jig and fit to an exterior of the protector.

Moreover, in the case where the jig is inserted through the jig insertion hole provided in the bottom wall of the protector as described above, when the upper ends of the two side walls sandwiching the bottom wall are closed, cuts are preferably provided at the upper ends of the two side walls to allow the central shafts of the jig to project from the closed upper ends.

Advantageous Effects of Invention

As described above, a protector according to the present invention has cuts provided from upper ends to side walls between which a branch wire outlet is provided so that side walls of a trunk wire insertion portion separate from the side walls of a branch wire insertion portion and deflect easily. Thus, the side walls can be bent to directions in which the side walls come close to each other, and engagement tabs can be inserted into and engaged with engagement holes without difficulty. Thereby, an upper opening of the protector can be closed, and thus a wire harness can be protected without coming off. In addition, since no lid is required, costs of protector can be reduced, and since no tape-winding is required, costs of tape and work procedures can be reduced.

BRIEF DESCRIPTION OF DRAWINGS

FIG. 7 Diagrams showing a modified example. (A) A side view of an entirety. (B) An enlarged perspective view of a critical portion.

FIG. 11 (A) and (B) Diagrams illustrating effect of the third embodiment. (C) A cross-sectional view showing a modified example of a rib.

FIG. 12 Diagrams showing a fourth embodiment. (A) A perspective view of a protector. (B) A perspective view showing a state in which the protector is held on an assembly work table. (C) A perspective view showing a state in which two side walls are brought down for closure after electric wires are inserted through the protector.

FIG. 13 (A) A perspective view showing a jig used in the fourth embodiment. (B) A perspective view showing a modified example of the jig.

FIG. 14 (A) and (B) Diagrams showing an exemplary conventional art.

FIG. 15 (A) and (B) Diagrams showing another exemplary conventional art.

DESCRIPTION OF EMBODIMENTS

Hereafter, embodiments of a protector of the present invention are descried with reference to the drawings. FIGS. 1 to 6 show a protector of a first embodiment. A protector 1 is made of a molded resin and has substantially a T-shape in which a branch wire insertion portion 3 is branched off from one side wall at a middle portion in a length direction of a trunk wire insertion portion 2.

Figure 1:
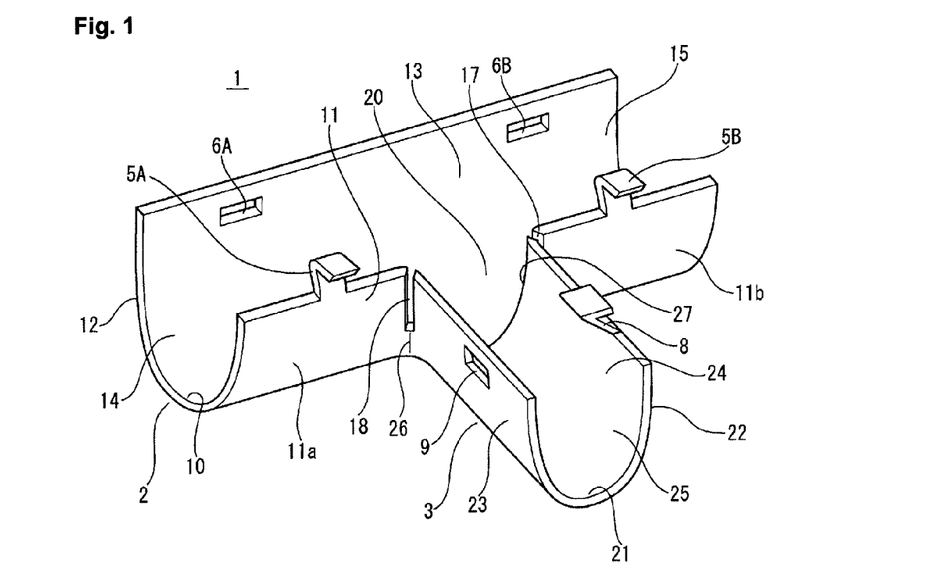
FIG. 1 A perspective view of a protector according to a first embodiment of the present invention.

The trunk wire insertion portion 2 and the branch wire insertion portion 3 each have a U-shaped cross-section. The trunk wire insertion portion 2 has a bottom wall 10, side walls 11 and 12 on two sides, an upper opening 13, and openings 14 and 15 at both ends in the length direction of the trunk wire insertion portion 2. The branch wire insertion portion 3 also has a bottom wall 21, two side walls 22 and 23, an upper opening 24, and an opening 25 at a front end.

A branch wire outlet 20 is provided in a middle portion of the side wall 11 of the trunk wire insertion portion 2, ranging from an upper end of the side wall 11 to the bottom wall of the trunk wire insertion portion 2. The bottom wall 21 and the side walls 22 and 23 of the branch wire insertion portion 3 project from a peripheral edge of the branch wire outlet 20. Specifically, a side wall 11a, which is one of side walls sandwiching the branch wire outlet 20 of the trunk wire insertion portion 2, is continuous with the side wall 23 of the branch wire insertion portion 3 via a curved boundary 26, and a side wall 11b, which is the other one of the side walls, is continuous with the side wall 22 via a curved boundary 27. The left and right curved boundaries 26 and 27 that sandwich the branch wire outlet 20 have slit-like cuts 17 and 18 formed from an upper end to a middle position in a height direction. The slit-like cuts 17 and 18 allow the side walls 11 (11a and 11b) of the trunk wire insertion portion 2 and the side walls 22 and 23 of the branch wire insertion portion 3 to incline separately.

Further, engagement tabs 5 (5A and 5B) project from upper ends of the side walls 11 (11a and 11b) of the trunk wire insertion portion 2 in positions away for a predetermined distance from each of left and right edges of the branch wire outlet 20, while engagement holes 6 (6A and 6B) that engage with the engagement tabs 5 (5A and 5B), respectively, are provided in a vicinity of an upper end of the side wall 12. An engagement tab 8 having a shape same as the engagement tabs 5 also projects from an upper end of the side wall 22 of the branch wire insertion portion 3, while an engagement hole 9 having a shape same as the engagement holes 6 is provided to the side wall 23.

As shown in FIG. 3(A), each engagement tab 5 has substantially a V-shape, in which a base 5a on one side projects diagonally from the upper end of the side wall 11 toward the side wall 12 on the opposite side, and a stem 5b on the other side projects from a projecting end of the base 5a in a bendback manner. The engagement tab 8 has the same shape. When the engagement tab 5 is inserted into the engagement hole 6, the stem 5b deflects such that an angle a of the V-shape between the base 5a and the stem 5b becomes smaller, as shown in FIG. 3(B). After passing through the engagement hole 6, the stem 5b opens up to restore to an original state, as shown in FIG. 3(C). Thus, the engagement tab 5 can be engaged with the engagement hole 6 without coming off.

Figure 2:
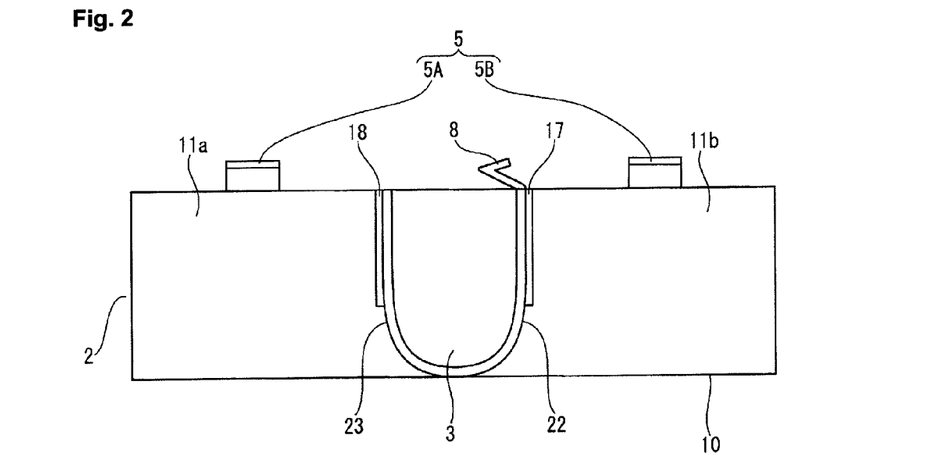
FIG. 2 A front view of the protector in FIG. 1.
Figure 3:
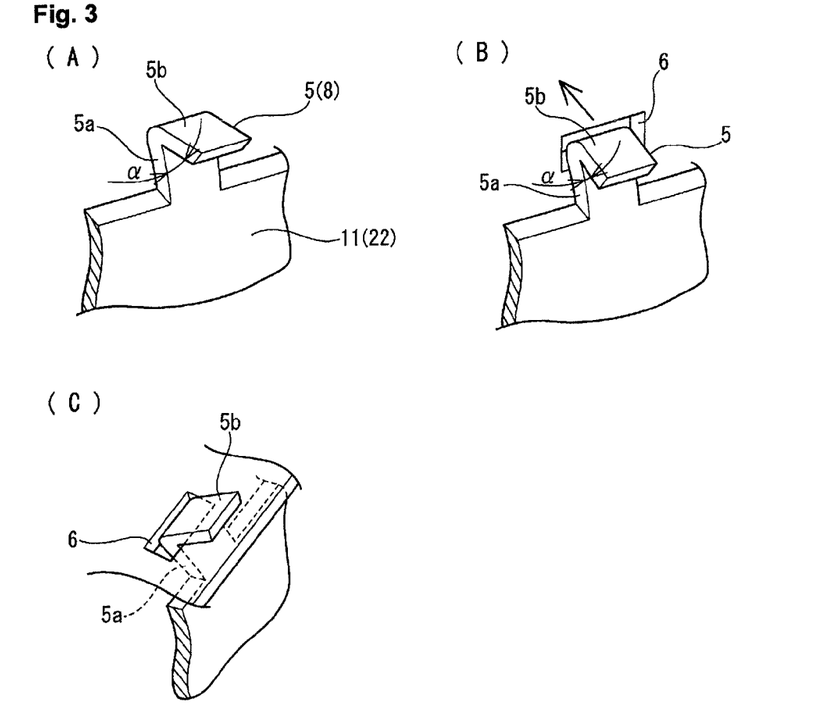
FIG. 3 Diagrams showing an engagement tab. (A) A perspective view. (B) A perspective view showing a state in which the engagement tab is being inserted into an engagement hole. (C) A diagram illustrating a state after the insertion of the engagement tab into the engagement hole.

An apex 5p of the side wall 11 having the engagement tabs 5 and an apex 6p of the side wall 12 having the engagement holes 6 are positioned on the same plane. This configuration facilitates closing work to insert and engage the engagement tabs 5 in the engagement holes 6.

Figure 4:
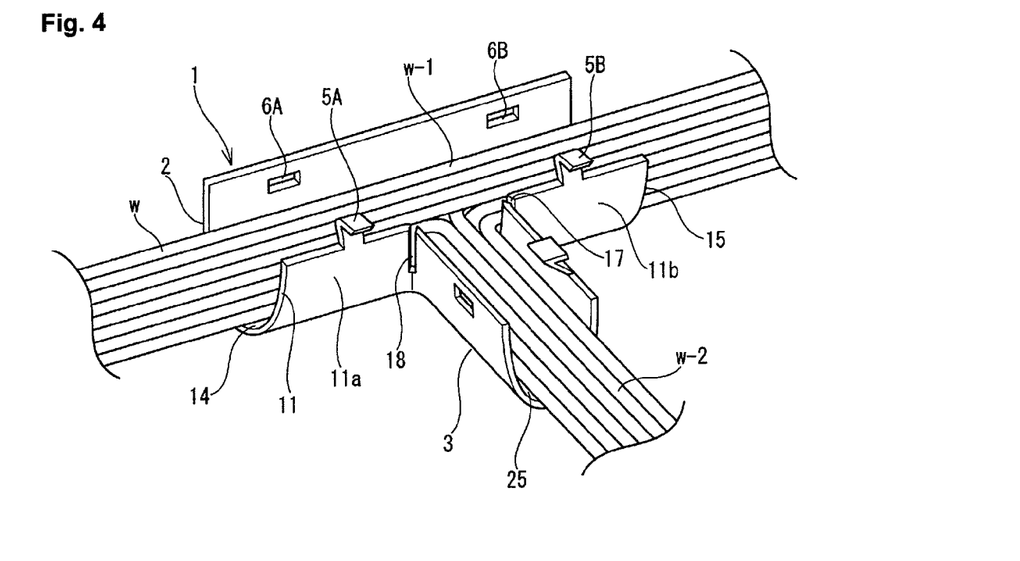
FIG. 4 A perspective view showing a state in which a wire harness is inserted through the protector.

A procedure to mount the protector 1 to a wire harness is described in the following. The protector 1 is supported by a supporting jig erected on a wire harness assembly work table (not shown in the drawings) and is placed along a wiring path of electric wires. As shown in FIG. 4, electric wires w constituting a wire harness W/H are sequentially inserted to a wiring jib to be wired, and in the protector 1, among the electric wires inserted into the trunk wire insertion portion 2 from the opening 14 on an inlet side, an electric wire w-1, which is a trunk wire, is pulled out from the opening 15. An electric wire w-2, which is a branch wire, is inserted into the branch wire insertion portion from the branch wire outlet 20 and is pulled out from the opening 25 at the front end.

Figure 5:
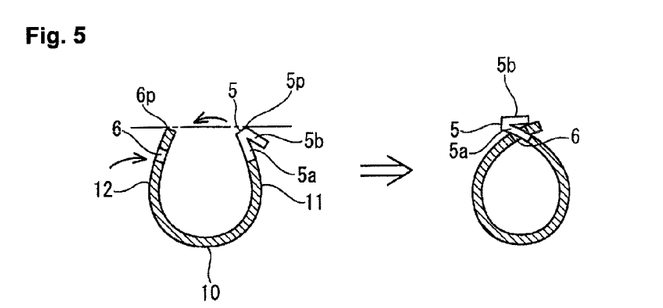
FIG. 5 A diagram illustrating work to insert and engage the engagement tab in the engagement hole.

After the wiring of electric wires is completed, as shown in FIG. 5, the side wall 11 in the trunk wire insertion portion 2 of the protector 1 is tilted to the side wall 12 from the upper end side. At this point, the two side walls 11a and 11b of the side wall 11 can be tilted toward the side wall 12 without difficulty because the side walls 11a and 11b are separated from the side walls 22 and 23 of the branch wire insertion portion 3 by the cuts 17 and 18 on the side wall 11 side where the branch wire insertion portion 3 branches off. Thus, the engagement tabs 5A and 5B projecting from the upper ends of the side walls 11a and 11b can be inserted to and engaged with the engagement holes 6A and 6B in the side wall 12, respectively. The insertion and engagement between the engagement tab 5A and the engagement hole 6A and between the engagement tab 5B and the engagement tab 6B provides firm locking as shown in FIG. 5(B). Since the side walls 22 and 23 in the branch wire insertion portion 3 are also separated from the side wall 11 by the cuts 17 and 18, the side walls 22 and 23 can be tilted to a direction in which the side walls 22 and 23 come close to each other, and the engagement tab 8 can be inserted to and engaged with the engagement tab 9.

Figure 6:
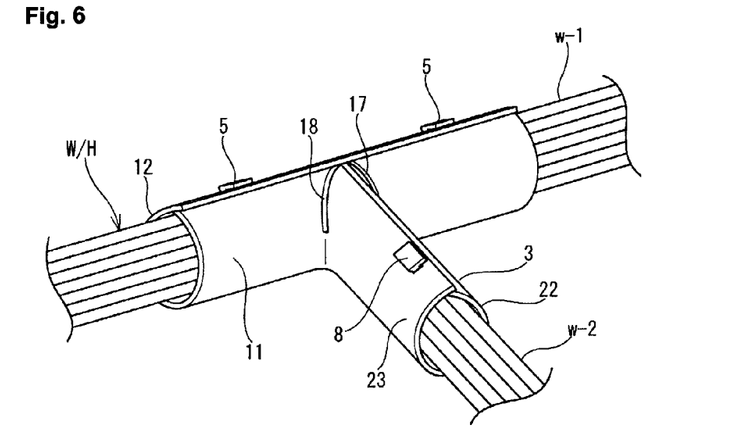
FIG. 6 A perspective view showing a state in which an upper opening of the protector is closed after the insertion of the wire harness.

Accordingly, as shown in FIG. 6, the upper opening 13 of the trunk wire insertion portion 2 is closed by engaging the upper ends of the two side walls 11 and 12 to each other. Similarly, the upper opening 24 of the branch wire insertion portion 3 is closed by engaging the upper ends of the two side walls 22 and 23 to each other.

As described above, the trunk wire and the branch wire of the wire harness can be branched and inserted into the protector in a state where the protector is mounted on the jig on the wire harness assembly work table. In addition, after the insertion, the upper openings of the trunk wire insertion portion 2 and the branch wire insertion portion 3 are closed, and thereby mounting of the protector to the wire harness from outside can be completed.

Figure 7:
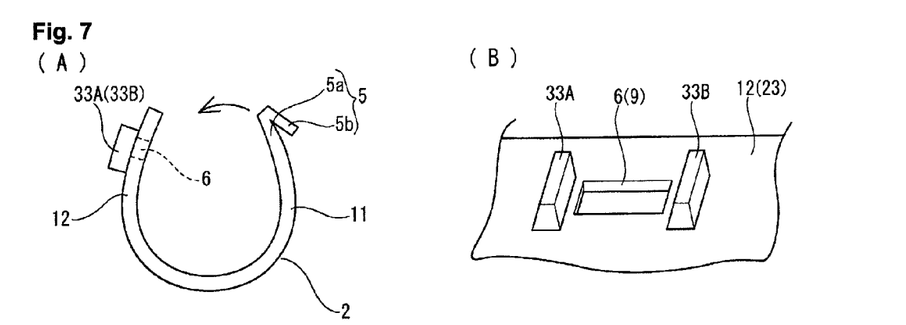
Figure 8:
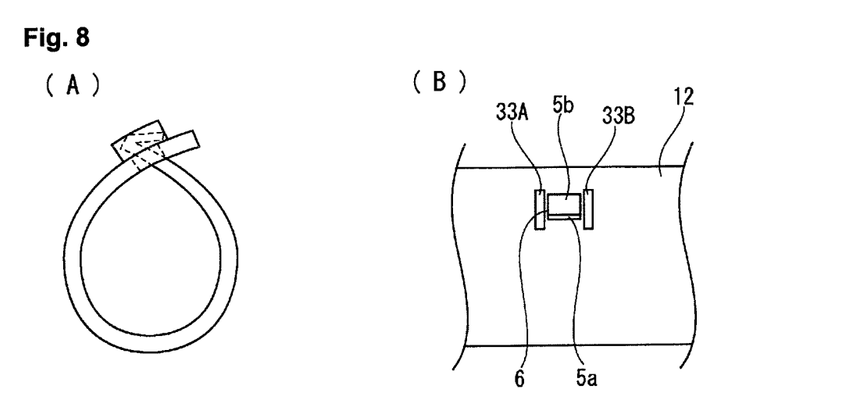
FIG. 8 Diagrams illustrating work to insert and engage an engagement tab in an engagement hole in the modified example.

A modified example of an engagement structure between an engagement tab and an engagement hole is shown on FIGS. 7 and 8. Protection portions 33A and 33B project from an outer surface of a side wall 12 (23) having an engagement hole 6 (9) formed of an elongated hole, the protection portions 33A and 33B being projections provided on both sides of the engagement holes 6. Each engagement tab 5 (8) has a V-shape similar to the previous embodiment. The base 5a of the engagement tab 5 is inserted through the engagement hole 6, and the stem 5b continuing from a front end of the base 5a is in contact with the outer surface of the side wall 12. As shown in FIG. 8(B), the stem 5b is provided between the protection portions 33A and 33B, and thereby the stem 5b is prevented from being interfered by external members. The protection portions 33A and 33B each may be a rectangular prism but are preferably a trapezoidal prism as shown in FIG. 7(B).

Figure 9:
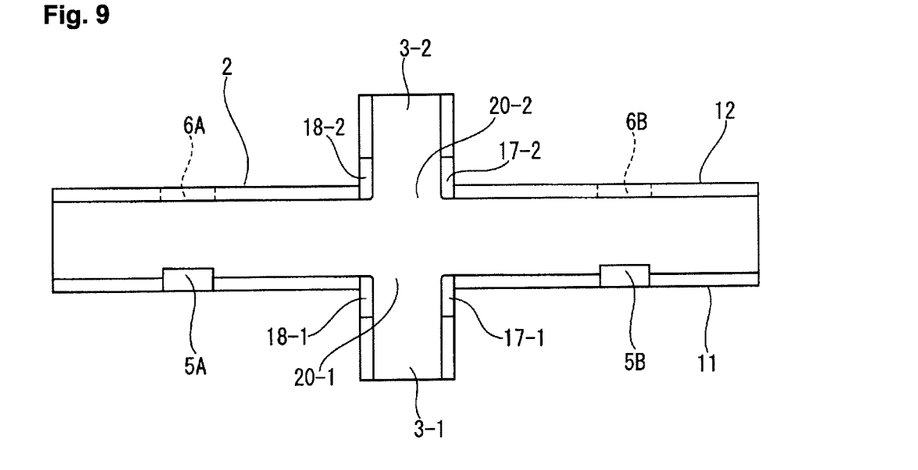
FIG. 9 A schematic plan view according to a second embodiment.

FIG. 9 shows a protector of a second embodiment. The protector is a cross-shaped protector in which branch wire outlets 20-1 and 20-2 are provided on the two side walls 11 and 12 of the trunk wire insertion portion 2, and branch wire insertion portions 3-1 and 3-2 are each branched off from each peripheral edge of the branch wire outlets 20-1 and 20-2. Cuts 17-1, 18-1, 17-2, and 18-2 are provided to the two side walls of the branch wire insertion portions 3-1 and 3-2 at the peripheral edges of the branch wire outlets 20-1 and 20-2.

Similar to the first embodiment, the engagement tabs 5A and 5B and the engagement holes 6A and 6B are provided to the two side walls 11 and 12 of the trunk wire insertion portion 2, respectively. Meanwhile, the branch wire insertion portions 3-1 and 3-2 on both sides are relatively short and have a length of 30 mm to 35 mm. Further, an adhesive tape is wound around from outer peripheral surfaces of front ends of the branch wire insertion portions 3-1 and 3-2 to outer peripheral surfaces of branch wires so that the branch wire insertion portions 3-1 and 3-2 are fixated with the branch wires. Accordingly, with the adhesive tape, the upper opening is narrowed, and approximately a half in a length direction of the upper opening is closed. Thus, the two side walls of the branch wire insertion portions 3-1 and 3-2 on both the sides are not provided with any engagement tab or engagement hole.

In the protector, the upper opening of the trunk wire insertion portion 2 can be closed by engaging the two side walls 11 and 12 to each other. Accordingly, similar to the first embodiment, no lid or tape-winding is required, and thus cost reduction is achieved.

Figure 10:
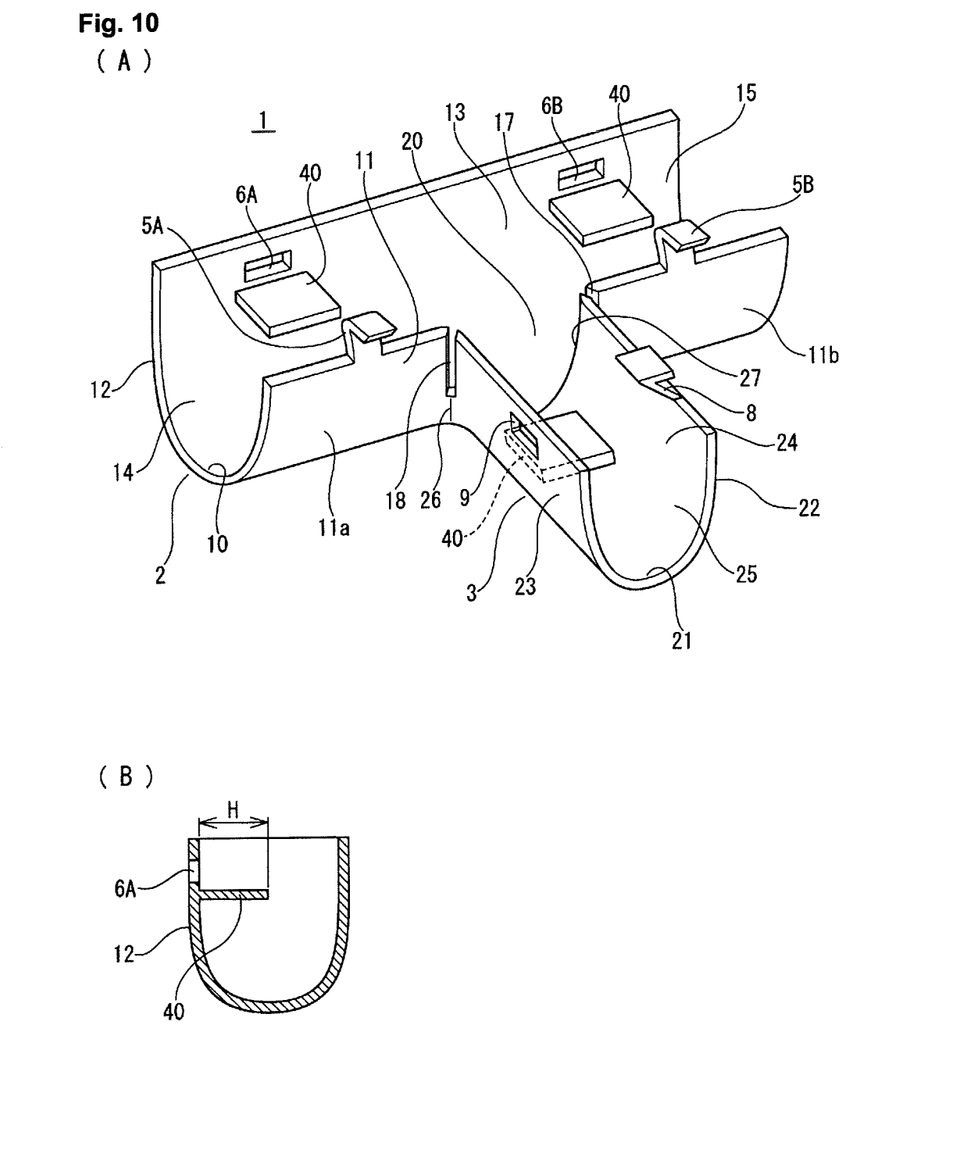
FIG. 10 Diagrams showing a third embodiment. (A) A perspective view. (B) A cross-sectional view of a critical portion.
Figure 11:
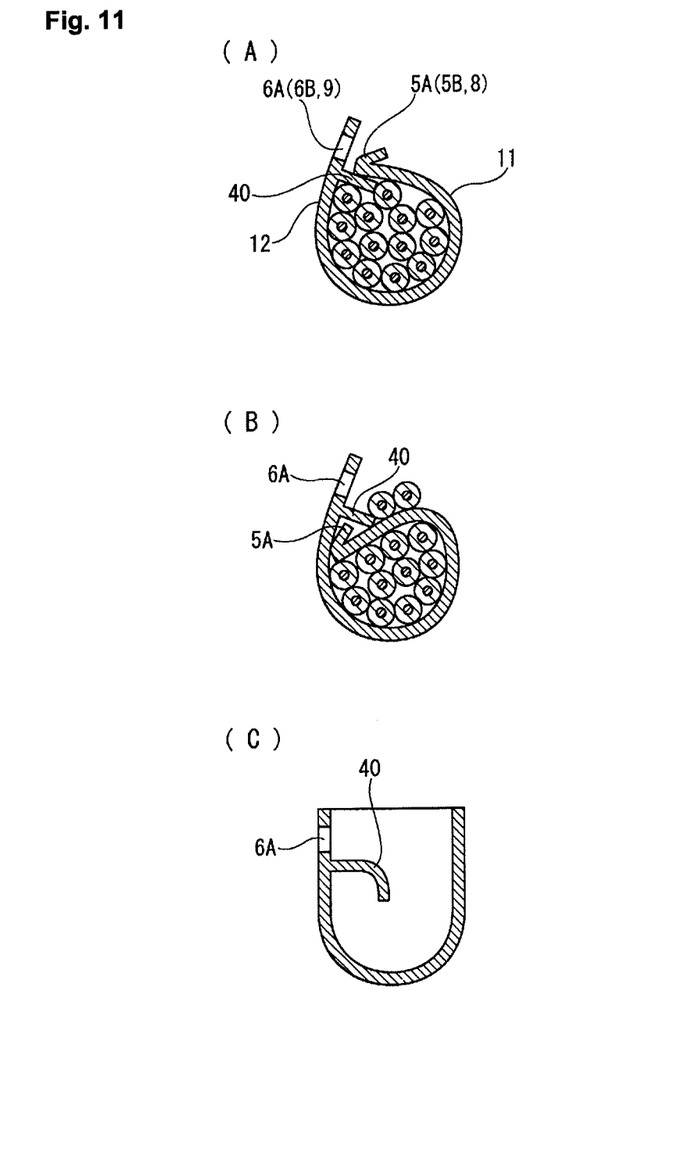

FIGS. 10 and 11 show a third embodiment. A protector 1 of the third embodiment has ribs 40 projecting along lower edges of the engagement holes 6A, 6B, and 9 from an inner surface of the side wall 12 having the engagement holes 6A and 6B of the trunk wire insertion portion 2 and from an inner surface of the side wall 23 having the engagement hole 9. The other configurations are the same as those of the protector of the first embodiment, and thus descriptions thereof are omitted.

The ribs 40 are longer than the engagement holes 6A, 6B, and 9, and a projection amount H from the inner surfaces of the side walls 12 and 23 is about 5 mm.

With the ribs 40 provided as described above, when the engagement tabs 5A, 5B, and 8 are inserted into the engagement holes 6A, 6B, and 9, respectively, in opposite positions, the engagement tabs 5A, 5B, and 8 can be smoothly inserted into the engagement holes 6A, 6B, and 9 by following along an upper surface of each rib 40, as shown in FIG. 11(A). In addition, as shown in FIG. 11(B), it is prevented from occurring that the engagement tabs 5A, 5B, and 8 are pushed in downwardly below the ribs 40 and are buried into the electric wires of the wire harness W/H. Thereby, damage to electric wires by the engagement tabs can be prevented.

Moreover, as the projection amount H of the ribs 40 is larger, the engagement tabs 5A, 5B, and 8 are more likely to be prevented from being pushed in downwardly. When the projection amount H is large, however, the ribs 40 interfere with insertion of the electric wires of the wire harnesses W/H. Accordingly, when the projection amount H is more than 5 mm, projecting end portions of the ribs 40 are provided to direct slightly downwardly as shown in FIG. 11(C) and to have flexibility so as to tilt downwardly when brought into contact with the electric wires that are pushed from above.

Figure 12:
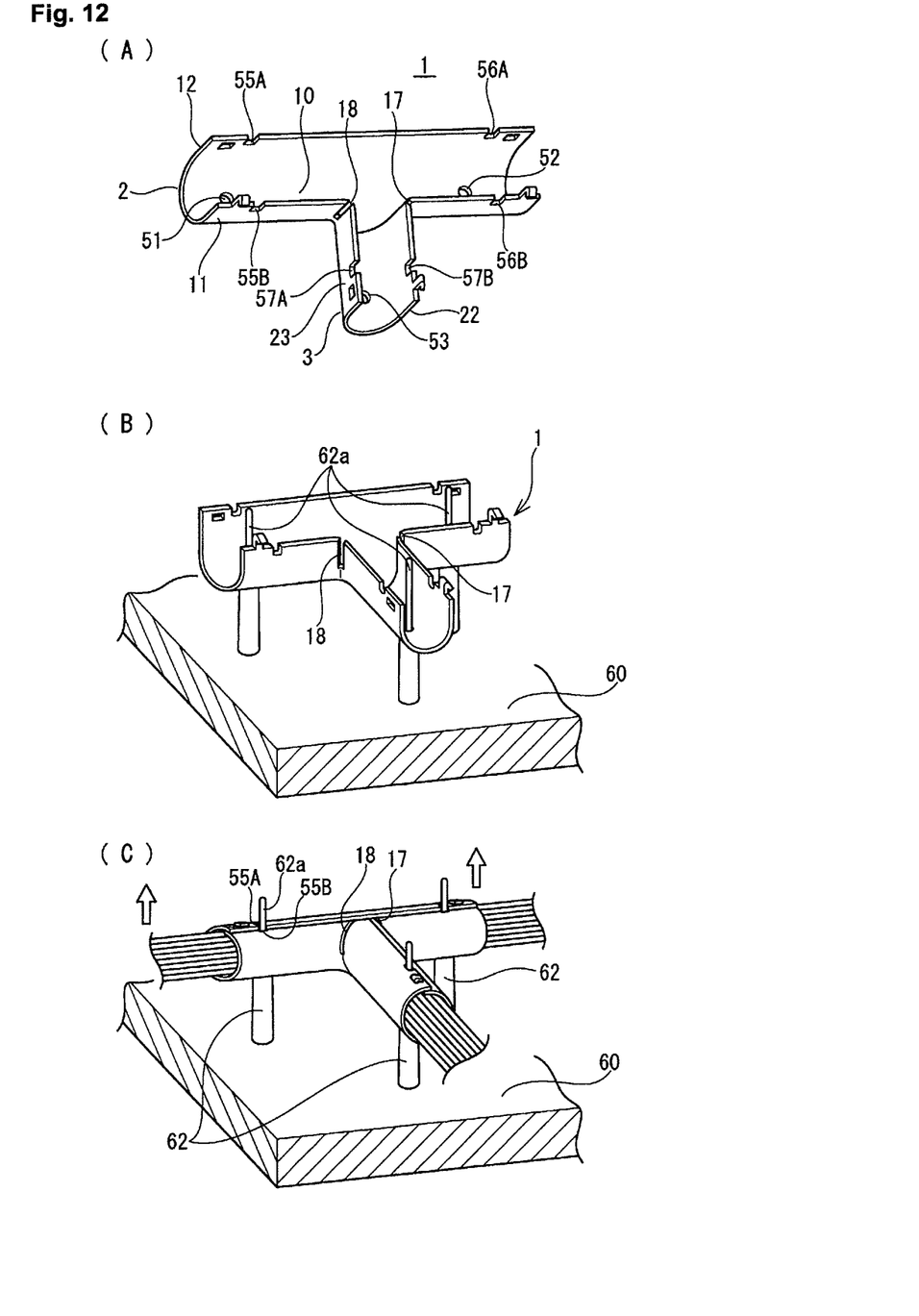
Figure 13:
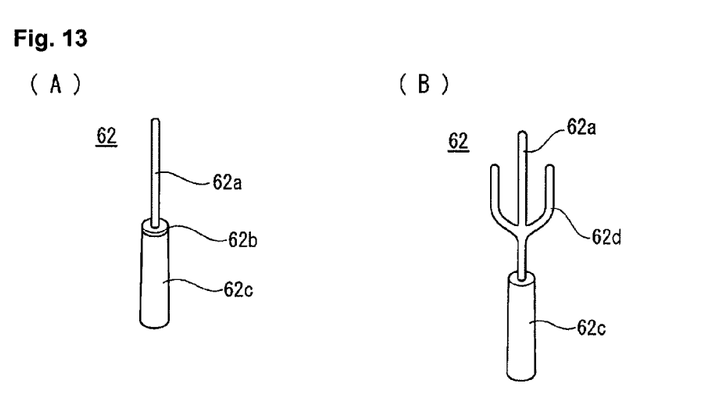

FIGS. 12 and 13 show a fourth embodiment. A protector 1 of the fourth embodiment is held by a jig erected on an assembly work table, and is securely positioned and held in a predetermined position without rotating or shifting when electric wires are inserted into the protector 1.

As shown in FIG. 12(A), jig insertion holes 51, 52, and 53 each are provided to a central portion in a width direction of each of the bottom wall 10 on both sides of the trunk wire insertion portion 2 and sandwiching the branch wire insertion portion 3 of the protector 1 and to the bottom wall of the branch wire insertion portion 3. The jig insertion holes 51, 52, and 53 provided in the three positions in total correspond to vertices of a triangle. Further, cuts 55A and 55B, cuts 56A and 56B, and cuts 57A and 57B are provided to the two side walls 11 and 12 and the two side walls 22 and 23 from upper ends thereof, the two side walls 11 and 12 and the two side walls 22 and 23 sandwiching the jig insertion holes 51 and 52, and 53. Other configurations of the protector 1 are the same as those of the first embodiment, and thus the same numerical references are provided and the descriptions thereof are omitted.

Protector positioning jigs 62 are erected on a work table 60 that is used to assemble a wire harness. As shown in FIG. 13(A), in each jig 62, a central shaft 62a projects from the center of a holder 62b, each central shat 62a being inserted into each of the jig insertion holes 51 to 53 provided to the bottom walls of the protector 1. The holder 62b has a hole diameter larger than that of the jig insertion holes 51 to 53. The holder 62b is provided to an upper end of a supporter 62c, which is raisably and lowerably provided to the work table 60.

As shown in FIG. 12(B), the jigs 62 erect on an upper surface of the work table 60, and the central shafts 62a are each inserted through each of the jig insertion holes 51, 52, and 53 of the protector 1, and the holder 62b holds the protector 1. The central shafts 62a each inserted into each of the jig insertion holes 51, 52, and 53 pass through the interior of the protector 1 and project upwardly above the upper ends of the side walls. Accordingly, the protector 1 is positioned at three points by the jigs 62 and is thus securely held without rotating on the work table 60 or shifting an trunk wire insertion portion.

As shown in FIG. 12(C), after the electric wires are inserted into the protector 1, when the two side walls 11 and 12 of the trunk wire insertion portion 2 are tilted so as to make contact to each other with edges thereof, the central shafts 62a of the jigs 62 each project between the cut 55A and 55B, between the cut 56A and 56B, and between the cut 57A and 57B, respectively, each of which is provided at the upper ends of the side walls. Thereby, the protector 1 can be pulled out upwardly in a sate where the two side walls of the protector 1 are closed.

A jig that holds the protector 1 on the work table 60 is not limited to the jig 62, and as shown in FIG. 13(B), for example, a jig having a central shaft 62a extending from the center of a bottom of a U-shaped receiver 62d may be used. In a case where the protector 1 is large in size, the U-shaped receiver 62d can fit and hold the protector from outside, thereby more stably holding the protector 1 and improving accuracy in assembling a wire harness to the protector 1.

REFERENCE SIGNS LIST

1: Protector
2: Trunk wire insertion portion
3: Branch wire insertion portion
5, 8: Engagement tab
6, 9: Engagement hole
11, 12, 22, 23: Side wall
17, 18: Cut
20: Branch wire outlet
40: Rib
51 to 53: Jig insertion hole
60: Work table
62: Jig

The invention claimed is:

1. A wire harness protector made of a resin, in which a wire harness insertion portion is surrounded by a bottom wall and two side walls and is provided with openings at both ends in a length direction and at an upper end, the wire harness protector comprising:
   a trunk wire insertion portion having a U-shaped cross section and two side walls and extending in a length direction;
   a branch wire insertion portion having a U-shaped cross section and two side walls and extending from a peripheral edge of a branch wire outlet provided in one side wall of the trunk wire insertion portion at a central position in the length direction, the side walls of the trunk wire insertion portion and the side walls of the branch wire insertion portion are continuous via a curved boundary on both sides of the branch wire outlet, and a slit provided from an upper end at each curved boundary; and
   engagement tabs and engagement holes provided in the trunk wire insertion portion, the engagement tabs projecting from the upper end of one side wall of the trunk wire insertion portion, the engagement holes being provided to opposite positions in the other side wall of the trunk wire insertion portion so as to engage with the engagement tabs, the engagement tabs and the engagement holes each being spaced apart in the length direction,
   wherein after a trunk wire and a branch wire are inserted into the trunk wire insertion portion and the branch wire insertion portion, respectively, the engagement tabs are inserted into and engaged with the engagement holes to close the upper ends of the two side walls of the trunk wire insertion portion, each engagement tab, which is inserted to and engaged with each engagement hole, has a V-shape in which a base projects diagonally from the upper end of one side wall towards the other side wall and a stem continues in a bend-back manner from a front end of a projecting portion of the base, an apex of the one side wall having the engagement tabs and an apex of the other side wall having the engagement holes are provided on a substantially same plane.

2. The wire harness protector according to claim 1, wherein an engagement tab and an engagement hole are provided to the side walls of the branch wire insertion portion so as to oppose to and engage with each other.

3. The wire harness protector according to claim 1, wherein ribs project from internal surfaces of the side walls of the trunk wire insertion portion along lower edges of the engagement holes.

4. The wire harness protector according to claim 1, wherein, the stem deflecting and decreasing an angle during insertion of the engagement tab to the engagement hole and returns to an original state to open up after the insertion so that the engagement tab does not come off from the engagement hole.

5. The wire harness protector according to claim 4, wherein each engagement hole is an elongated hole; protection portions project from both sides of the engagement hole; and the stem is provided between the protection portions.

6. The wire harness protector according to claim 1, wherein jig insertion holes are provided to a central portion in a width direction of each portion of a bottom wall of the trunk wire insertion portion sandwiching the branch wire insertion portion, and to a bottom wall of the branch wire insertion portion, and a central shaft of a jig is inserted into each of the jig insertion holes.

* * * * *